(12) United States Patent
Hoang (10) Patent No.: US 8,595,321 B2
(45) Date of Patent: Nov. 26, 2013

(54) SUPPORTING SYSTEM FOR REMOTE CONTROL

(76) Inventor: Nguyen Xuan Hoang, Ho Chi Minh (VN)

( * ) Notice: Subject to any disclaimer, the term of this patent is extended or adjusted under 35 U.S.C. 154(b) by 136 days.

(21) Appl. No.: 13/095,703

(22) Filed: Apr. 27, 2011

(65) Prior Publication Data

US 2012/0005390 A1    Jan. 5, 2012

(51) Int. Cl.
*G06F 15/16* (2006.01)
(52) U.S. Cl.
USPC .......................... 709/217; 709/203; 709/218
(58) Field of Classification Search
USPC ................ 709/203, 217, 219, 224, 226, 228; 370/389
See application file for complete search history.

(56) References Cited

U.S. PATENT DOCUMENTS

2007/0294368 A1* 12/2007 Bomgaars et al. ............ 709/217
2008/0181209 A1*  7/2008 Hochmuth ................... 370/389

* cited by examiner

*Primary Examiner* — Quang N Nguyen
(74) *Attorney, Agent, or Firm* — Kirton McConkie; Evan R. Witt (57) ABSTRACT

A remote control support system provides a simple way to allow remote users to access a computer in a variety of circumstances, even when no software installed on the computer. In some cases, the system includes a hardware device to simulate most USB mice, keyboards, storage devices, camera sensors (to capture a screen display), etc. The hardware device can communicate with a remote computer (via a network connection) to allow a user, such as a remote technician, to work on the remote computer as through the user were sitting at the remote computer. Information technology professionals and other users can use the described systems to communicate with a user at a remote computer in a natural way to communicate via voice, video or chat with online messaging.

20 Claims, 4 Drawing Sheets

SUPPORTING SYSTEM FOR REMOTE CONTROL

FIELD

This application refers to a support system for a remote control for users of personal computers, servers or devices that support digital assistants (PDAs), such as MP3 players, cell phones, etc. More specifically, the invention refers to the support system that allows remote users (possibly the IT experts) controlling equipment from anywhere via a network (e.g. a LAN or WAN) to access a personal computer, server, PDA, etc. (also known as "managed computer") and to manage data, diagnose hardware or software errors, repair or install new software, or an operating system—regardless of the status of the managed device—with running software or a completely new device, which has not had any software installed on it.

BACKGROUND

The concept of computer control from a remote virtual device over the internet is a major concern in many applications, especially in computer networks and in other cases when users cannot directly access and use their computer.

Hardware and software running on personal computers have become increasingly complex. Therefore, normal users cannot handle all of the issues that are happening to their computers. The above-described invention may help users in a way that, instead of having an on-site expert, allows users to have a remote information technology expert dealing with their devices as they are sitting before their equipment. In this regard, it may be important that the IT specialist can communicate with users in a natural way (e.g., with voice communication, online video chat, text messaging (chat), etc.).

Today, the communication between computers or servers to peripheral devices has become increasingly standardized. For example, most devices (like the keyboard and the mouse, as well as other peripherals) have switched to using the Universal Serial Bus (USB) technology. The USB technology standard defines a mode of hardware and software communication for connecting peripheral devices of a computer to the computer (and among computers). Accordingly, this technology creates a standard connection for a mouse, keyboard, and storage devices for each computer, whether the computer runs Windows PC, MAC PC, Linux PC or Windows Mobile (i.e., phones using the Windows operating system, etc.).

At present, there are many solutions as well as patents referring to methods for remotely accessing a computer over a network. Some of these solutions can be summarized in the two following approaches:

First, access to software: This is the most common approach for remote access to computers over the network. This application can be integrated in an operating system, such as a Remote Terminal Service in Microsoft Windows, or run as a standalone application, such as RealVNC or TeamViewer software. Some of these solutions such as TeamViewer can even allow users to have remote access to computers behind a firewall. However, the disadvantages of these methods require the software running on the computer to be managed. If this computer does not have any software, the user may not be able to do anything on that computer.

Second, access to hardware: This approach is intended to address the limitations of the software approach in the case of a problem in a system or without any pre-installed software. Typically, the U.S. Pat. No. 6,636,929 provides a method for simulating composite USB devices intended to simulate any peripherals on the remote computer that is considered as a local peripheral device on the managed device. This method allows the user to re-boot a computer with the software on the remote computer. This solves the problems in the software approach, but there are a few drawbacks, specifically: By simulating the peripheral storage devices, such as CD-ROM with CD-ROM, on a remote console, the response time can be very slow, especially when the network connection is slow. This makes the implementation become unfeasible.

This design requires a special video control hardware video to collect data and video from the inside bus and implement a web server software for this system to be remotely accessed. This causes inconvenience to normal users when installing that system, as well as bearing higher costs incurred to installing the hardware.

So far, all existing solutions are not designed for natural interaction between local users and remote users with the voice or video communication.

SUMMARY

Therefore, the purpose of the invention is to propose technical solutions in order to simulate the interaction of local users with a computer, such as an event that occurs in the mouse or input keyboard, talking to other guests, tracking the screen displays and interacting with external peripherals, such as CD-ROM, printers, etc.

The purpose of the invention is to disclose a simple way which allows a user or technician to remotely access a computer in any situation, no matter what software is pre-installed, by creating a hardware device to simulate the composite USB device (USB composite) for a mouse, keyboard, storage device, etc. A remote terminal can control this simulated device to send mouse and keyboard events to the managed computer and to allow running applications from emulated storage devices.

A feature in the remote access is that, in some embodiments, it is intended to monitor an output screen of the managed computer. This will be solved by different approaches:

A first approach can involve using a specialized hardware to collect RGB signals from the managed computer. The collected data can be converted to digital data, compressed and encrypted and then be sent to a remote computer.

A second, alternative, approach can involve using the camera module to monitor a computer display. By using a low-resolution camera, users can track the status of the output display and input commands appropriately.

A third approach is initially used when no software is running and the remote system is controlled. In this regard, the third approach can involve running agent software to collect screen data and to send such data to devices that support remote management.

The third approach mentioned above can also be used to control computer startup. Indeed, by simulating a boot device, this system can make the computer run agent software when starting up. Furthermore, the software will simulate the normal booting process but can divert the output of data to the screen to the remote management supporting device via the USB interface.

With the remote terminals, remote users can upload, delete applications or data to the local storage unit of the remote supporting device, from which it can send events happening in the keyboard and mouse to run these applications on the managed computer. Applications can be a new software, new operating systems, antivirus software, data testing software, etc.

With remote terminals, remote users can communicate with local users in any suitable manner, including by natural way of voice, video or talking communication. The invention hereby proposes a number of priority schemes of the invention, but the invention is not limited in this plan.

In some implementations of the remote control supporting system, the system includes a remote support device that includes a processor and peripheral BUS logic, composite USB function logic (mentioned above) connecting to a port to simulate an input device such as USB standard keyboard, mouse, and in which the above-mentioned remote support device has a memory storage connected to the composite USB function logic to simulate the USB mass-storage devices; and in which the above-mentioned remote support device has more a network interface, this interface could be Ethernet, Wi-Fi, 3G, etc., or any future network technology.

a remote control console application runs on a control computer connected to the above-mentioned remote control devices via a network connection, and in which the remote control console application mentioned above transfers data from the keyboard, mouse of the above control computer to the remote support devices via the above network connection, and in which the above remote support device will simulate events in the keyboard, mouse on the composite USB function logic mentioned above as if they are on the keyboard, mouse connected to USB cable, and in which the above-mentioned remote control console application via a network connection can transfer files (data or applications) to or from the storage memory of the above remote support device;

an agent application running on a managed computer connected to the above remote support device via USB in the case where a output screen captures the agent application from the managed computer and transfer it to the above remote control device via the USB communication mode; and in which the above remote support device transfers the data captured by the output display to the remote control console application via a network interface and displays on the local display screen of the above personal computer.

The remote control support system, in which the system includes:

a remote support device includes a processor and peripheral BUS logic, composite USB function logic mentioned above connected to a port to simulate standard USB devices such as keyboards, mouse, and in which the above remote support remote device has an additional storage memory, this memory is connected to the composite USB function logic to simulate a USB storage device recovery; and in which the above remote support device has an additional network interface, this interface could be Ethernet, Wi-Fi, 3G, etc., or any network technology in the future; and in which the above remote support device has an additional camera sensor, this sensor will be used to capture the output screen of the above managed computer and transfer it to the remote control console through a network interface;

a remote control console application runs on remote control personal computer and is connected to the above remote support device via a network connection, and in which the remote control console application transfers the data from the keyboard, mouse of the above control computer to the remote support device via a network connection, and in which the above remote control device will simulate events occurring on the keyboard, mouse on the composite USB function logic as if they are on the keyboard, mouse connected to USB cable, and in which the remote control console application mentioned above will receive the captured output screen data of the managed computer from the remote support device and displays on a local screen display;

in which the remote control console application via a network connection can transfer files to or from the storage memory of the above remote support device;

an agent application running on a managed computer is connected to the above remote support device via USB, in which the output screen captures the agent application of the above managed computer and transfer it to the above remote support via USB communication, and in which the remote support device transfers the output data of the screen capturing the remote control console application via the network interface and displays on the local screen of the above control computer.

The remote control support system, in which the system includes:

a remote support device includes a processor and peripheral BUS logic, composite USB function logic connected to a port to simulate a standard USB devices such as keyboards, mouse; and in which the above remote support remote device has an additional storage memory, this memory is connected to the composite USB function logic to simulate a USB storage device recovery; and in which the above remote support device has an additional network interface, this interface could be Ethernet, Wi-Fi, 3G, etc., or any network technology in the future; and in which the above remote support device has an additional camera sensor, this sensor will be used to capture the output screen of the above managed computer and transfer it to the remote control console through a network interface;

a remote control console application runs on remote control personal computer and is connected to the above remote device via a network connection, and in which the remote control console application transfers the data from the keyboard, mouse of the above control computer to the remote support device via a network connection, and in which the above remote control device will simulate events occurring on the keyboard, mouse on the composite USB function logic as if they are on the keyboard, mouse connected to USB cable, and in which the remote control console application via a network connection can transfer files to or from the storage memory of the above remote support device;

The remote control support system, in which the system includes:

a remote support device includes a processor and peripheral BUS logic, composite USB function logic connected to a port to simulate a standard USB devices such as keyboards, mouse; and in which the above remote support remote device has an additional storage memory, this memory is connected to the composite USB function logic to simulate a USB storage device recovery; and in which the above remote support device has an additional network interface, this interface could be Ethernet, Wi-Fi, 3G, etc., or any network technology in the future; and in which the above remote support device has an additional video decoding hardware to capture VGA output of the managed computer; this data will be compressed and encrypted and then transferred to the above remote console through the network interface.

an remote control agent application running on a managed computer is connected to the above remote support device via a network connection; and in which the remote control console transfers the data from the keyboard, mouse of the above control computer to the remote support device through the above network connection; and in which the above remote control device will simulate events occurring on the keyboard, mouse on the composite USB function logic as if they are on the keyboard, mouse connected to USB cable, and in which the remote control console application via a network connection can transfer files to or from the storage memory of the above remote support device;

The disclosed remote control support system may have a remote support device that includes an additional memory storage, possibly NAND Flash, SPI flash, SD/MMC, IDE, etc., or any storage technology in the future.

The disclosed remote control support system may have a remote support device that includes peripheral BUS logic, a composite USB function logic, but not be limited for other peripheral standards such as eSATA, PCMCIA, PS2, etc, allowing to simulate a mass storage, keyboard or mouse.

The disclosed remote control support system may have a remote device that includes an external bus logic is a type of USB host interface allows simulation mode of communication USB devices will work with in mode USB devices such as MP3 players, digital cameras, etc.

The disclosed remote control support system may have a remote device that includes an additional audio codec, and in which devices support remote data processing sound through the audio codec on the matter and transfer via a network connection to have a method of voice communication applications with the remote control device and other remote support.

The disclosed remote control support system may have a routing server since the applications can be added to support the routing between devices and remote support applications since the remote control on, the routing between devices and remote support traditional voice over IP protocol.

BRIEF DESCRIPTION OF THE DRAWINGS

The following description can be better understood in light of the Figures, in which.

The Figures illustrate specific aspects of the described supporting system for remote control. Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described devices. Moreover, the Figures may show simplified or partial views, and the dimensions of elements in the Figures may be exaggerated or otherwise not in proportion for clarity.

DRAWINGS-REFERENCE NUMERALS

100 Managed computer (computer is managed)
101 Agent software running on managed computer
102 USB driver on managed computer
103 Display driver on managed computer
200 Remote Assistant Device
201 Main processor of remote assistant device
202 The USB (or UART, PS2) emulating module
203 The network interface module of Remote Assistant Device
204 The storage of Remote Assistant Device
205 The camera sensor
206 The Audio codec
300 Remote terminals
301 Remote management application
400 Routing servers
401 Routing applications
402 Other application such as logging application

DETAILED DESCRIPTION

Some technical terms are used in the description below with reference to the specific components of the system. Furthermore, the skilled artisan will recognize that some computer companies referred to herein, may also be called by one or more different names. This document is not intended to distinguish the different components in names rather different functions. In the following discussion, the terms "include" and "including" are used as being open ended, and therefore should be interpreted as "including but not limited to . . . ." Additionally, the term "connected" is intended to indicate a power connection indirectly or directly. Therefore, if a first device is connected to another device, it could be connected via direct electrical connection or an indirect electrical connection via other devices and connections. The term "computer management" or "computer manager" may also be used herein to refer to a computer or server that is being used or can be managed from a remote console. In contrast, the term "remote control" may mean a computer or server including a controller board with a capacity of input and output that can be used to manage a computer. The term "computer" may be broadly used herein to include personal computers, workstations, servers, or devices based on different processors, in which case, these devices may be caused by user programming to perform one or more functions and/or multiple operations.

Figure 1:
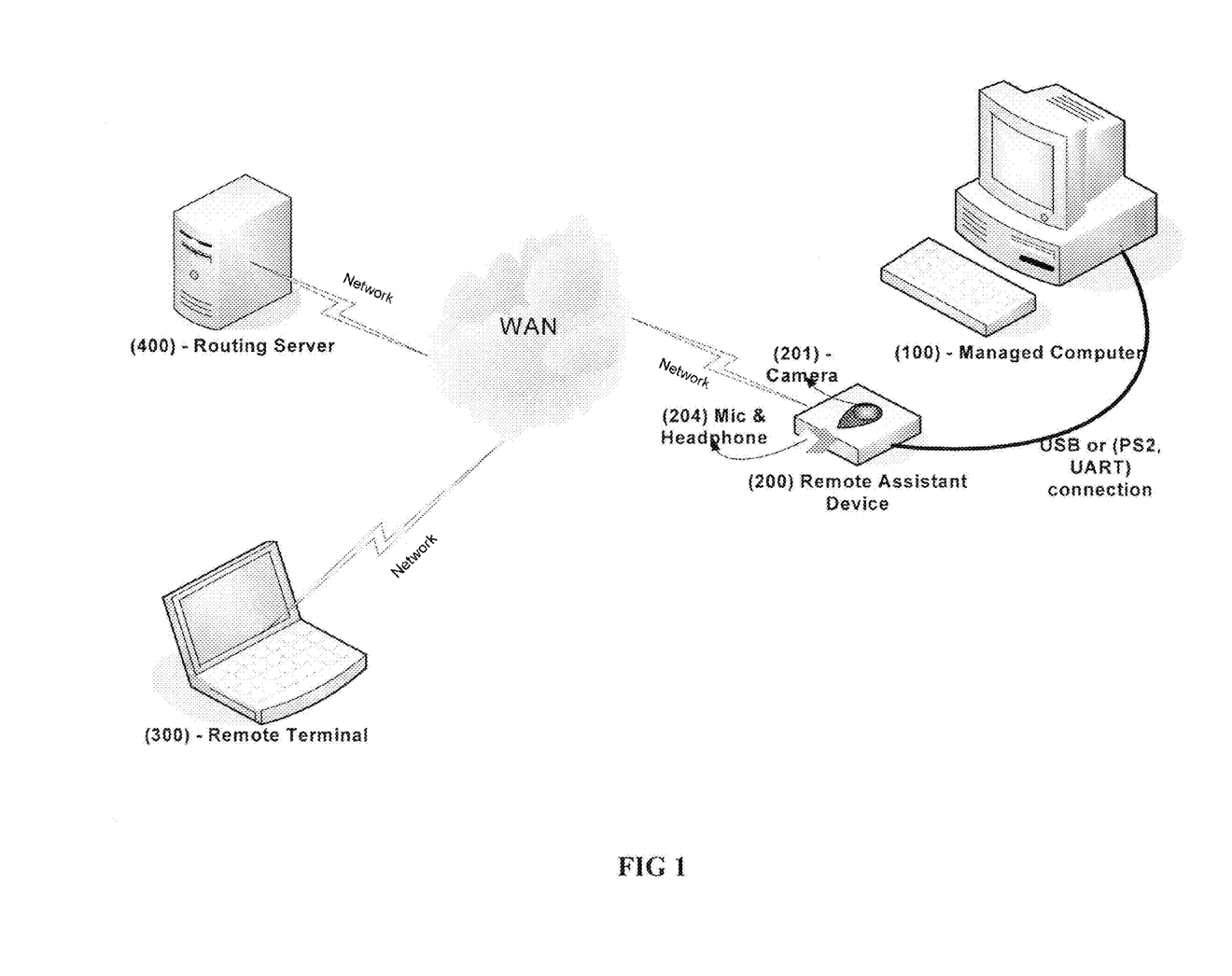
FIG. 1 shows a representative embodiment of a block diagram of a system, which illustrates: a connection between devices that support remote management, including a remote assistant device, a managed computer, a remote terminal and a routing server.

One embodiment of the design scheme is illustrated in FIG. 1. In particular, FIG. 1 shows the present invention can include a velvet board (200) (also known as the remote management support device, the remote assistance device, or the remote management) connected to a common computer (100) (also called a managed computer) through multi-purpose serial bus (USB), and a computer (300) (also called a remote computer or a remote terminal) that are connected to devices that support remote management via a network connection (usually Ethernet or Wi-Fi). A routing server (400) device connects to the remote support and remote computers to provide routing and service.

Figure 2:
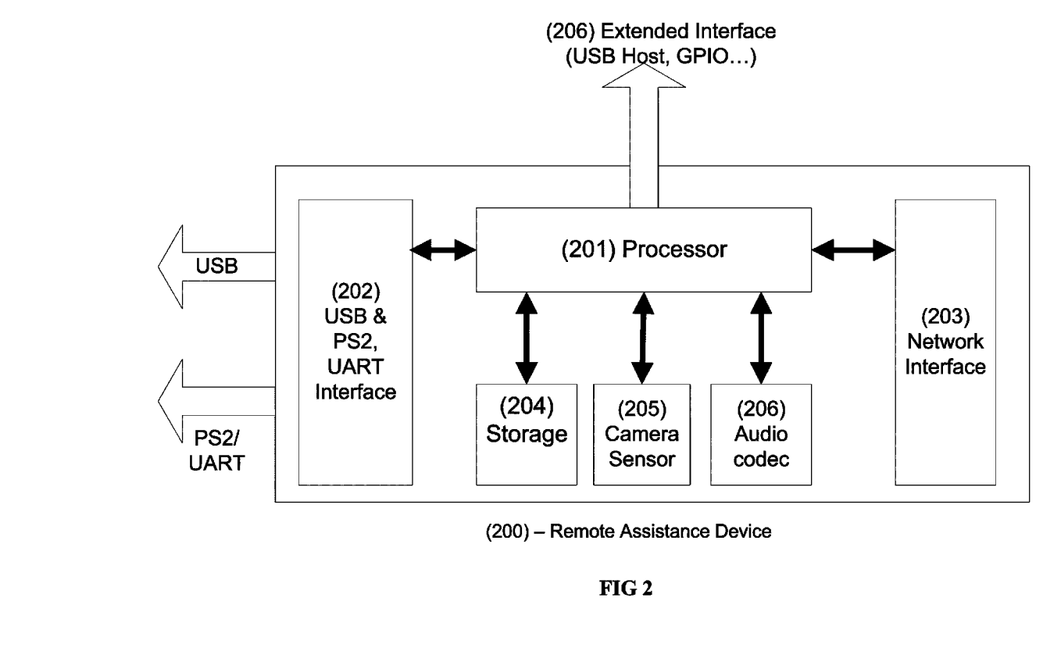
FIG. 2 shows a representative embodiment of a detailed block diagram, which indicates some hardware components of a remote assistant device.

FIG. 2 shows that, in some embodiments, the remote assistance device (200) can be a major component of the invention and can include a main processor (201), a USB interface (202) (also called a USB simulation module (e.g., a UART, PS2, etc.) to communicate with the managed computer (100), a network interface (203) to communicate with remote computer (300) and the server routing (400), a storage component (204) to store applications or data, audio, etc. This part will be downloaded or uploaded from a remote computer, a camera sensor (205) to collect data output of the computer display of the managed computer (100) and an audio codec (206) for phone applications.

Figure 3:
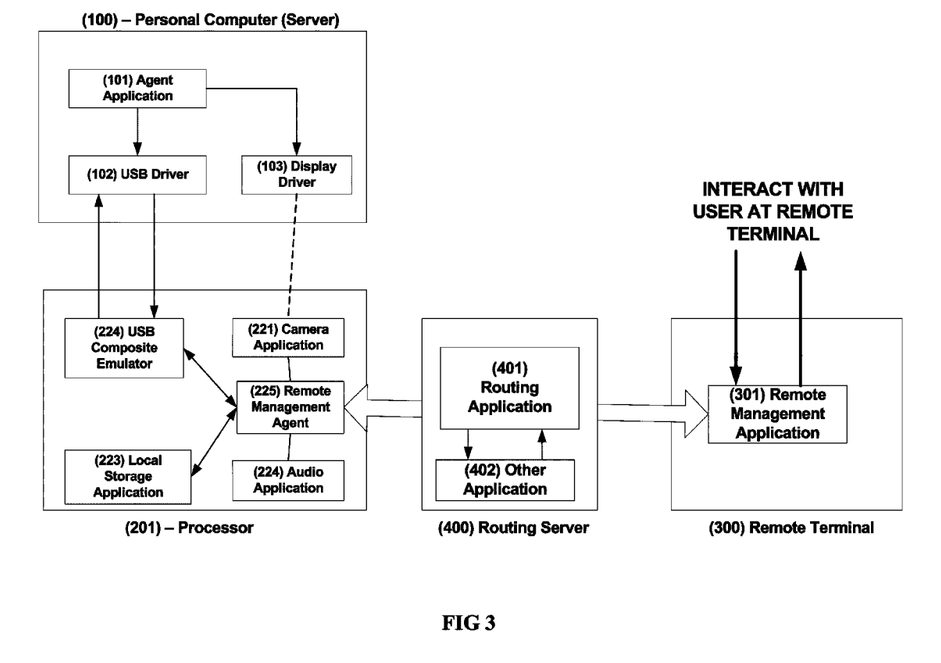
FIG. 3 presents a block diagram showing a representative embodiment of a general interrelationship of software applications that can be implemented in the system of FIG. 1.

FIG. 3 shows some embodiments of a technical description of the invention in which the remote computer (300) runs a software application (301) (or a remote managed application). This application generally can gather input from the remote control as events take place at the keyboard, mouse, and will be sent to the remote management support device via network connections and devices can simulate events as events taking place locally on the managed computer (100). Another feature of the application (301) is allowed to upload data and applications stored on the parts inside the remote management support device, then this data will be included in the computer such as device management storage. The description above is clear to an engineer in networking and embedded systems can be realized without a design document detailing.

One technical feature of the invention is the natural communication between experts sitting at a remote computer (300) and home users in computer management. In this regard, voice over IP can be made between the remote system support and application software (301). An engineer in networking and embedded systems having average knowledge in the field of this technique can perform this operation without a detailed explanation of this feature.

Referring again to FIG. 3, a technical feature of the invention is that an application agent (101) (also called agent software running on a managed computer) can be running on the managed computer (100). This application agent can capture the screen display output, compress, encrypt it and send it to the remote management support device. The following data will be sent to the remote computer for monitoring. Generally, this communication will be done through the USB device, the compression algorithms of different data (e.g., compressed or compressed to preserve information is not preserved) can be used to reduce the amount of data sent. One aspect of some embodiments of the invention is that the data can be secured and the developer can use different encryption methods to ensure that data is secure. Application developers can enable faster data transfer between computer and security (100) and equipment (200).

Another technical feature of the invention is a screen capture solution of the computer output management, or managed computer (100) by using the camera to capture the screen by directing the camera toward the screen. An application can be installed on the device and can run on the remote management support device (200) to collect, encrypt and compress data and then to send the data over a network connection to the remote computer (300) for monitoring. This sector has the technical knowledge of cameras, network, this module may not need detailed.

Referring again to FIG. 1, a routing server (400) convention can be set to guide the remote terminal to communicate with remote devices. Especially when these devices are managed behind the firewall (Firewall) where there is no direct TCP/IP connection. A network engineer in the field can deploy this server without the detailed design documents.

Figure 4:
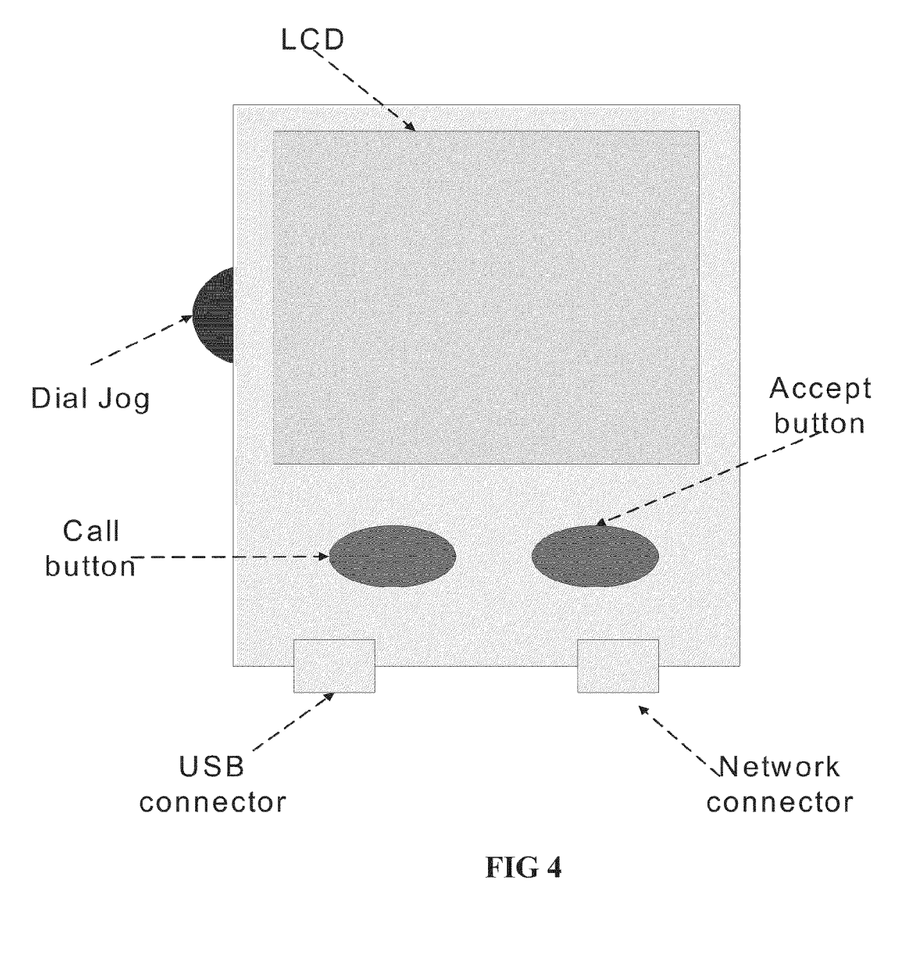
FIG. 4 shows a schematic diagram of a representative embodiment of the remote assistant device.

The application operations described herein are designed in the simplest possible level. As depicted in FIG. 4, in some embodiments, the device has only a few buttons. Accordingly, users do not need any special knowledge, whenever their computers face a problem, they can request the remote support by doing four steps as follows:

Step 1: Turn on the device and connect the remote management support device with a managed computer via a USB connection and connect to the network via a network connection device. If the device has a camera sensor, the user may direct the camera toward the monitor of the managed computer.

Step 2: Using the scroll function (or another suitable function) to select the remote user (or omit it to allow the operators to make decision).

Step 3: Press the "Call" button to make a voice call over IP to the remote user (If step 2 has been skipped, a voice call over IP to an operator can be made, then the operator can direct who will be a remote user).

Step 4: Through exchanging phone calls (e.g., via an IP connection), users will explain what they need to accomplish on their computers (like installing new software, installing a new operating system, rescuing deleted data, etc.), in which remote users can explain how they operate, what is the best solution, how much they charge for services, etc. If everything is agreed, user will press the button "Accept", from which the remote user shall assume the rights of controlling the computer.

In addition, it is noticed that in the process of use, the user can cancel the operation at any time by pressing back the button "Call" or by disconnecting the device from the network.

Therefore, according to some embodiments of the described system, the system can allow remote access to a computer with just a few simple requirements and without requiring the pre-installation of a complicated hardware or any preinstalled software.

Although the description provided above contains many features, they do not limit the scope of the invention by any plans, but they are only examples illustrating some of the priority plans of the system. There may be more sub-branches and variations to implement different plans. For example, the communication bus between the managed computer and the remote management support device is not only the USB device but another communication standard as well, which allows the simulation of mouse, keyboard, storage device, etc.

Therefore, the scope of this application should be determined by the following requirements for protection and the legal equivalent requirements, but not determined by the given examples.

The invention claimed is:

1. A remote control supporting system, the system comprising:
   a remote support device that includes a processor, peripheral BUS logic, and composite USB function logic connectable to a port of a managed computer to simulate an input device of a control computer, wherein the remote support device has a memory storage device connected to the composite USB function logic to simulate a USB mass-storage device, and wherein the remote support device comprises a network interface;
   a remote control console application that runs on the control computer connected to the remote support device via a network connection, wherein the remote control console application transfers data from the input device of the control computer to the remote support device via the network connection, wherein the remote support device simulates events of the input device on the composite USB function logic as if they are on an input device connected to a USB cable that is connected to the managed computer; and wherein the remote control console application is able, via the network connection, to transfer files to or from the memory storage device of the remote support device; and an agent application running on the managed computer connected to the remote support device via a USB connection in a case where the agent application captures an output screen from the managed computer and transfers it to the remote support device via a USB communication mode and wherein the remote support device transfers data captured by the output screen to the remote control console application via the network interface and displays the data on a local display screen of the control computer, wherein the remote support device is able to provide the agent application to the managed computer.

2. The remote control support system according to claim 1, in which the remote support device is compatible with peripheral standards selected from eSATA, PCMCIA, UART, and PS2 to simulate a mass storage, keyboard or mouse.

3. The remote control support system according to claim 1, in which the remote support device simulates communication with MP3 players and digital cameras.

4. The remote control support system according to claim 1, wherein the remote support device includes an additional audio codec which supports remote audio data processing through the audio codec and transfer via a network connection to provide a method of voice communication applications with the remote support device and other remote support.

5. The remote control support system according to claim 1, comprising a routing server to support the routing between devices and remote support applications.

6. A remote control support system, in which the system includes:
a remote support device that includes a processor, peripheral BUS logic, and composite USB function logic connectable to a port of a managed computer to simulate a USB device of a control computer, wherein the remote support device has a storage memory, wherein the storage memory is connected to the composite USB function logic to simulate a USB storage device recovery, wherein the remote support device has a network interface, wherein the remote support device has a camera sensor to capture an output screen of the managed computer and transfer the output screen to the control computer through the network interface;
a remote control console application that runs on the control computer and is connected to the remote support device via a network connection, wherein the remote control console application transfers data from an input device of the control computer to the remote support device via the network connection; and wherein the remote support device is configured to simulate events occurring on the input device of the control computer on the composite USB function logic of the remote support device as if the events are on an input device connected to the managed computer via a USB cable, wherein the remote control console application receives captured output screen data of the managed computer from the remote support device and displays the data on a local screen display, and wherein the remote control console application is able, via the network connection, to transfer files to or from the storage memory of the remote support device; and an agent application running on the managed computer that is connected to the remote support device via a USB connection, in which the agent application captures output data of a screen of the managed computer and transfers it to the remote support device via the USB connection, wherein the remote support device transfers the output data to the remote control console application via the network interface and displays the output data on a local screen of the control computer, wherein the remote support device is able to provide the agent application to the managed computer.

7. The remote control support system according to claim 6, in which the remote support device is compatible with peripheral standards selected from eSATA, PCMCIA, UART, and PS2 to simulate a mass storage, keyboard or mouse.

8. The remote control support system according to claim 6, in which the remote support device simulates communication with MP3 players and digital cameras.

9. The remote control support system according to claim 6, wherein the remote support device includes an additional audio codec which supports remote audio data processing through the audio codec and transfer via a network connection to provide a method of voice communication with the remote support device and other remote support.

10. The remote control support system according to claim 6, comprising a routing server to support the routing between devices and remote support applications.

11. A remote control support system, in which the system includes:
a remote support device that includes a processor, peripheral BUS logic, and composite USB function logic connectable to a port of a managed computer to simulate a USB device of a control computer, wherein the USB device comprises at least one of a keyboard and a mouse;
in which the remote support device has a storage memory, wherein the storage memory is connected to the composite USB function logic to simulate a USB storage device recovery;
in which the remote support device has a network interface;
in which the remote support device has a camera sensor that is capable of capturing an output screen of the managed computer and transferring it to a remote control console application through a network interface;
in which the remote control console application runs on the control computer and is connected to the remote support device via a network connection;
in which the remote control console application transfers data from the at least one of the keyboard and the mouse of the control computer to the remote support device via the network connection; and
in which the remote support device is capable of simulating events occurring on the at least one of the keyboard and the mouse of the control computer as if such were occurring on at least one of a keyboard and a mouse connected to the managed computer via a USB connection; and
in which the remote control console application is able, via the network connection, to transfer files to or from the storage memory of the remote support device.

12. The remote control support system according to claim 11, wherein the additional storage memory is selected from NAND Flash, SPI flash, SD/MMC, and IDE.

13. The remote control support system according to claim 11, in which the remote support device is compatible with peripheral standards selected from eSATA, PCMCIA, UART, and PS2 to simulate a mass storage, or the at least one of the keyboard and the mouse of the control computer.

14. The remote control support system according to claim 11, in which the remote support device simulates communication with MP3 players and digital cameras.

15. The remote control support system according to claim 11, wherein the remote support device includes an additional audio codec which supports remote audio data processing through the audio codec and transfer via a network connection to provide a method of voice communication with the remote support device and other remote support.

16. A remote control support system, in which the system includes:
- a remote support device that includes a processor, peripheral BUS logic, and composite USB function logic connectable to a port of a managed computer to simulate a USB device of a control computer, wherein the USB device comprises at least one of a keyboard and a mouse; and
- in which the remote support device has a storage memory, this storage memory being connected to the composite USB function logic to simulate a USB storage device recovery;
- in which the remote support device has a network interface; and
- in which the remote support device has video decoding hardware to capture VGA output data of the managed computer; this output data being compressed and encrypted and then transferred to the control computer through the network interface;
- a remote control agent application running on the managed computer is connected to the remote support device via a USB connection;
- in which a remote control console application transfers data from the at least one of the keyboard and the mouse of the control computer to the remote support device through the network connection;
- in which the remote support device is configured to simulate events occurring on the at least one of the keyboard and the mouse of the control computer on the composite USB function logic as if they are on a keyboard or mouse connected to USB cable that is connected to the managed computer;
- in which the remote control console application is able, via a network connection, to transfer files to or from the storage memory of the remote support device; and
- in which the remote support device is able to provide the remote control agent application to the managed computer, even when the managed computer has not had any software installed on it.

17. The remote control support system according to claim 16, wherein the additional storage memory is selected from NAND flash, SPI flash, SD/MMC, and IDE.

18. The remote control support system according to claim 16, in which the remote support device is compatible with peripheral standards selected from eSATA, PCMCIA, UART, and PS2 to simulate a mass storage, or the at least one of the keyboard and the mouse of the control computer.

19. The remote control support system according to claim 16, in which the remote support device simulates communication with MP3 players and digital cameras.

20. The remote control support system according to claim 16, wherein the remote support device includes an additional audio codec which supports remote audio data processing through the audio codec and transfer via a network connection to provide a method of voice communication with the remote support device and other remote support.

\* \* \* \* \*